United States Patent [19]

Diener

[11] Patent Number: 4,823,445
[45] Date of Patent: Apr. 25, 1989

[54] STORAGE CLIP

[76] Inventor: Michael P. Diener, P.O. Box 161, Novato, Calif. 94948

[21] Appl. No.: 159,269

[22] Filed: Feb. 23, 1988

[51] Int. Cl.$^4$ .............................................. B65D 63/00
[52] U.S. Cl. ..................................... 24/326; 24/3 A; 24/270
[58] Field of Search ............... 24/3 A, 3 L, 3 R, 270, 24/326, 327, 330, 331; 280/822

[56] References Cited

U.S. PATENT DOCUMENTS

| | | | |
|---|---|---|---|
| 743,399 | 11/1903 | Seebold et al. | 24/3 A |
| 1,271,368 | 7/1918 | Roberts | 24/326 |
| 1,401,770 | 12/1921 | Golden | 24/331 |
| 1,701,057 | 2/1929 | Thatcher | 24/3 A |
| 2,006,843 | 7/1935 | Russell | 24/326 |
| 2,449,882 | 9/1948 | Daniels | 24/3 A |
| 3,059,645 | 10/1962 | Hasbrouck et al. | 24/326 |
| 3,947,924 | 4/1976 | Fox et al. | 24/3 A |
| 4,162,081 | 7/1979 | Joseph | 280/822 |
| 4,511,164 | 4/1985 | Orchard | 24/270 |

Primary Examiner—Victor N. Sakran
Attorney, Agent, or Firm—Larry D. Johnson

[57] ABSTRACT

An improved clip device provides releasable retention of an accessory object to a primary object. The storage clip comprises a shaped clasp member having a jaw portion for secure engagement of a mounting strap, a body portion adjacent said jaw portion, a shoulder portion adjacent said body portion, and terminates in a tab portion adjacent said shoulder portion. The jaw, body, and shoulder portions are each configured to form an obtuse angle relative to its adjacent portion, and in the direction of said mounting strap, thereby defining a void or cavity between the clasp member and the mounting strap. The terminating tab portion preferably forms an angle relative to the adjacent shoulder portion and away from the mounting strap, providing a manually engageable surface for lifting the clasp member away from the mounting strap.

3 Claims, 1 Drawing Sheet

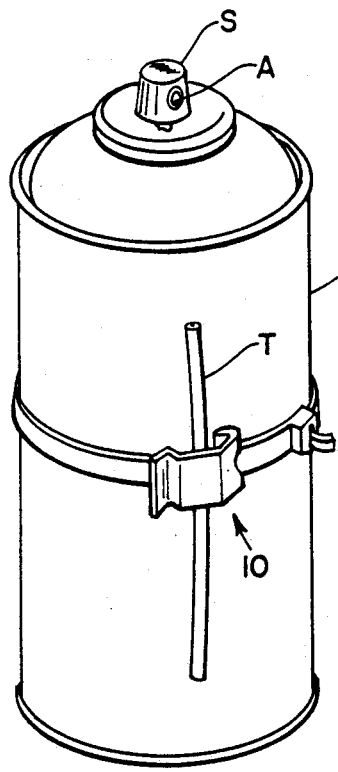
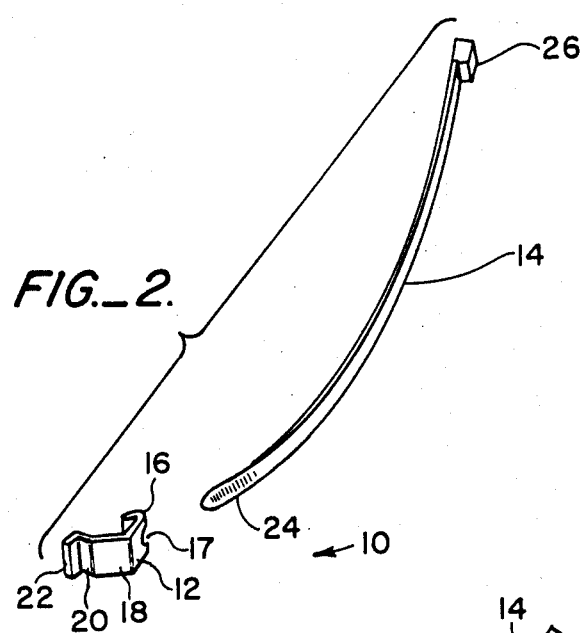
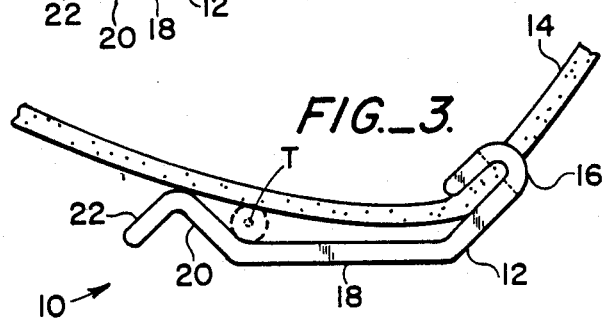
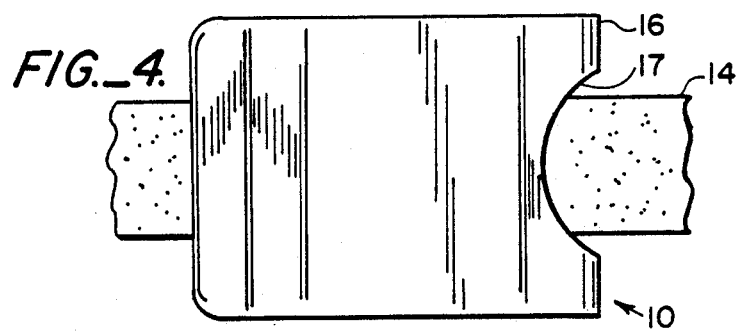
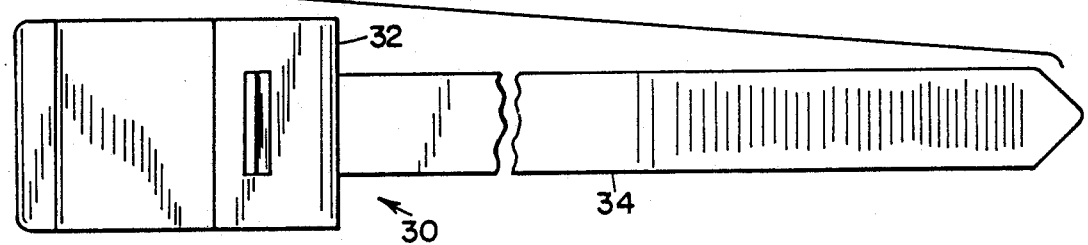
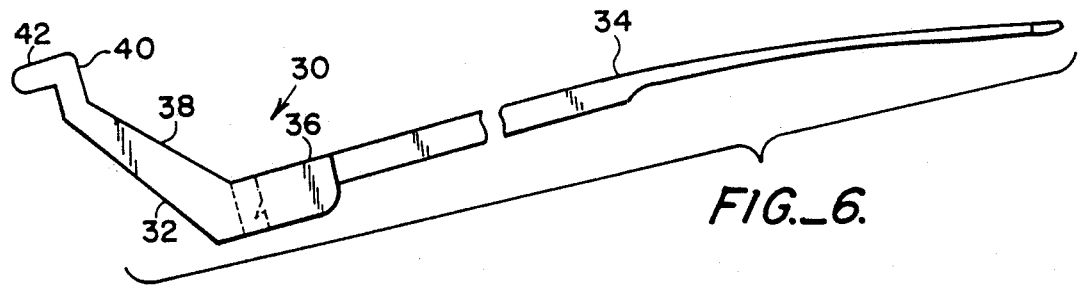

STORAGE CLIP

BACKGROUND OF THE INVENTION

1. Field of the Invention

This invention relates generally to clasping and securing devices, and more specifically to an improved clip device for releasable retention of an accessory object to a primary object.

2. Description of the Prior Art

Many products, such as lubricants, cleaners, solvents, and the like, are packaged and dispensed in aerosol pressurized containers, which typically include a depressible valve or spray nozzle through which the contents of the container are sprayed. Such containers often additionally include an accessory extender spout or dispensing tube that can be inserted into the spray nozzle to restrict and direct delivery of the contents to a narrow stream, rather than a wide spray. These dispensing tubes are usually attached to the container by means of a simple elastic band, which is prone to breakage or loss. Alternatively, an integral, cap-mounted clip or similar device can be used, but these generally require a full-diameter cap to be able to hold the dispensing tube against the body of the container. In addition, such caps must be formed and included in the original product, and do not readily lend themselves to the retrofitting of a dispenser tube to a container.

SUMMARY OF THE INVENTION

The storage clip of this invention provides an improved clip device for releasable retention of an accessory object to a primary object. The storage clip comprises a shaped clasp member having a jaw portion for secure engagement of a mounting strap, a body portion adjacent said jaw portion, a shoulder portion adjacent said body portion, and terminating in a tab portion adjacent said shoulder portion. The jaw, body, and shoulder portions are each preferably configured to form an obtuse angle (e.g., one hundred thirty-five degrees) relative to its adjacent portion, and in the direction of said mounting strap, thereby defining a void or cavity between the clasp member and the mounting strap. The terminating tab portion preferably forms an angle (e.g., ninety degrees) relative to the adjacent shoulder portion and away from the mounting strap, providing a manually engageable surface for lifting the clasp member away from the mounting strap.

In use, the free end of a mounting strap is inserted into the jaw portion of the clasp member, and the jaw portion is crimped or otherwise locked about the strap to secure the clasp member in place. The strap is then wrapped around a primary object (e.g., an aerosol container), and the strap free end is inserted through and locked into the strap lock portion of the mounting strap, securing the clasp member and mounting strap adjacent the primary object. The clasp can then be lifted slightly away from the strap by lifting the tab portion, and an accessory object (e.g., a dispensing tube for an aerosol container) inserted beneath the body and shoulder portions of the clasp member to be removably captured between the clasp member and the strap member.

In an alternate embodiment, the clasp member and mounting strap are formed from appropriate material as a one-piece, integral unit. In this embodiment, the free end of the mounting strap is simply wrapped around the primary object of interest, and placed into the clasp member jaw portion, where it is captured by a one-way tooth or similar feature. Thus, the clasp member jaw portion in this embodiment effectively includes and replaces the strap lock portion of the mounting strap of the previously described embodiment. Such an arrangement eliminates the necessity of mating the separate mounting strap and clasp member, and crimping of the jaws of the clasp member about the strap.

BRIEF DESCRIPTION OF THE DRAWINGS

FIG. 1 is a perspective view of a storage clip of this invention in place and in use to releasably retain an accessory dispensing tube to the side of a common aerosol-pressurized container;

FIG. 2 is a perspective view of a storage clip of this invention with the free end of its associated mounting strap prepared for insertion into the hole of the jaw portion of the storage clip;

FIG. 3 is a partially cutaway top view of the storage clip of this invention with its associated mounting strap secured within the hole of the jaw portion, and an accessory dispensing tube (illustrated in phantom) captured between the storage clip and mounting strap;

FIG. 4 is a partially cutaway front elevational view of the storage clip with its associated mounting strap secured thereto;

FIG. 5 is a partially cutaway front elevational view of an alternate embodiment of a storage clip of this invention, in which the clasp member and mounting strap are formed as a unitary, integral unit; and FIG. 6 is a partially cutaway top view of the unitary embodiment of the storage clip of this invention with an integral mounting strap.

DETAILED DESCRIPTION OF A PREFERRED EMBODIMENT

FIG. 1 is a perspective view of a storage clip 10 of this invention in place and in use to releasably retain an accessory dispensing tube T to the side of a common aerosol-pressurized container C. Such dispensing tubes are typically used to insert into an annulus A of the container spray nozzle S, so that the contents of the container are delivered as a narrow stream rather than a wide spray.

FIG. 2 is a perspective view of a storage clip 10 of this invention illustrating its clasp member 12 and associated tie-wrap or mounting strap 14. Clasp member 12 comprises a jaw portion 16 (here illustrated in its open configuration) having a hole 17 for secure engagement of the mounting strap, a body portion 18 adjacent said jaw portion, a shoulder portion 20 adjacent said body portion, and terminates in a tab portion 22 adjacent said shoulder portion. Mounting strap 14 includes free end 24 for insertion into the hole 17 of the jaw portion, and a lock portion 26 for engagement of the free end 24 after it has been wrapped around an object of interest.

FIG. 3 is a partially cutaway top view of the storage clip 10 of this invention with its associated mounting strap secured within the hole of the jaw portion. Jaw portion 16 can be crimped or otherwise locked about the strap to fix the clasp member 12 in place. The jaw portion 16 forms an obtuse angle (e.g., one hundred thirty-five degrees) with body portion 18, relative to the mounting strap. Similarly, the body portion 18 forms an obtuse angle with the shoulder portion 20, relative to the mounting strap. Thus, the clasp member defines a void or cavity between itself and the mounting strap, which cavity can accommodate an accessory object such as a dispensing tube T (shown here in phantom).

The terminating tab portion 22 forms an angle (e.g., ninety degrees) with the adjacent shoulder portion 20 and away from the mounting strap, thus providing a lifting surface to manually pull the clasp member away from the mounting strap for insertion of such an accessory object. Tension from the mounting strap then urges the clasp back to its "closed" position to grasp the accessory object, which is thus captured between the strap member and the shoulder and body portions of the clasp member.

FIG. 4 is a partially cutaway front elevational view of the storage clip 10 with its associated mounting strap secured thereto. In this view, the hole 17 of jaw portion 16 can be seen to be arcuate in shape, and of a size to accommodate insertion of strap 14.

FIG. 5 is a partially cutaway front elevational view of a modified, unitary storage clip 30. This modified clip can be made of nylon or other suitable material, and integrates a clasp member 32 and mounting strap 34 into a one piece unit.

FIG. 6 is a partially cutaway top view of the unitary storage clip 30. Clasp member 32 includes jaw portion 36, body portion 38, shoulder portion 40, and tab portion 42, all analogous to the previously described embodiment.

Of course, the storage clip of this invention could be made in any size, and from any suitable material. In a typical, two-piece embodiment, for example, the clasp member may be made of thin metal approximately one and one-eighth inches by one-half inch in gross dimensions, with a five-sixteenth inch hole for accommodation of the mounting strap. Such a size has been found to be able to fit around and operate with a primary object as small as three-quarters of an inch in diameter (and with a maximum primary object diameter limited only by the length of the mounting strap). Indeed, the roles of the "primary" and "accessory" objects may be reversed: the storage clip strap portion can be placed around a wire, conduit, or other relatively small object, and the clasp portion clamped over and secured to a wall edge, flange, or other relatively large (albeit narrow) object.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A storage clip for releasably retaining an accessory object to a primary object, said storage clip conditioned for attachment to a mounting strap having a free end and a strap lock portion, said storage clip comprising:
   a clasp member having a single jaw portion, said single jaw portion conditioned for secure capture of said mounting strap, a body portion adjacent to said jaw portion and configured to define a void between said body portion and said mounting strap, and a tab portion adjacent to said body portion, said tab portion providing a manually engageable surface for lifting said body portion away from said mounting strap, wherein when said mounting strap free end is wrapped around a primary object and secured in said strap lock portion, said clasp member body portion is urged by tension against said strap member to capture an accessory object placed therebetween.

2. The storage clip of claim 1 wherein said body portion forms an obtuse angle relative to said jaw portion, and including a shoulder portion adjacent to and forming an obtuse angle with said body portion.

3. A storage clip for releasably retaining an accessory object to a primary object, said storage clip comprising:
   a clasp member having a strap portion, a single jaw portion adjacent said strap portion, a body portion adjacent to said single jaw portion, a shoulder portion adjacent to said body portion, and a tab portion adjacent to said shoulder portion, said single jaw portion conditioned for secure capture of said strap portion, wherein when said strap portion is wrapped around a primary object and secured in said jaw portion, said clasp member body and shoulder portions define a void between said clasp member and said strap portion and are urged by tension against said strap portion to capture an accessory object placed therebetween.

* * * * *